INVENTOR.
Wayne R. Johnson
BY
ATTORNEY

Aug. 8, 1967 W. R. JOHNSON 3,335,218

TELEVISION RECORDING AND REPRODUCING APPARATUS WITH SUBSTITUTE HORIZONTAL SYNC AND MULTIPLEXED AUDIO

Filed June 12, 1964

5 Sheets-Sheet 2

INVENTOR.
Wayne R. Johnson
BY [signature]
ATTORNEY.

INVENTOR.
Wayne R. Johnson
BY
ATTORNEY.

INVENTOR.
Wayne R. Johnson
BY [signature]
ATTORNEY.

INVENTOR.
Wayne R. Johnson
BY [signature]
ATTORNEY.

3,335,218

TELEVISION RECORDING AND REPRODUCING APPARATUS WITH SUBSTITUTE HORIZONTAL SYNC AND MULTIPLEXED AUDIO

Wayne R. Johnson, Woodland Hills, Calif., assignor to Winston Research Corporation, a corporation of California Filed June 12, 1964, Ser. No. 374,632
17 Claims. (Cl. 178—6.6)

ABSTRACT OF THE DISCLOSURE

The apparatus includes signal processing circuitry for modifying received television signals containing video, horizontal synchronizing and sound information to adapt it for single track longitudinal recording on magnetic tape. The received horizontal synchronizing information is blocked and a new synchronizing signal inserted. The received audio signal is multiplexed into the time intervals the received horizontal signals had occurred. Before recording, the signal is dynamically emphasized to compensate for head-tape losses.

The apparatus further includes signal retrieval circuitry to separate from the tape recorded signal, separate video information, horizontal synchronizing and audio signals, the recorded horizontal synchronizing signal being used to derive timed gating signals to control the separation of the recorded signal into its three component parts.

The present invention relates to systems and apparatus for the magnetic recording of video signals, and associated sound signals, and for subsequently reproducing such recorded signals.

Although systems and apparatus for recording intelligence on a magnetic tape, or equivalent medium, have been known for some time, it is only recently that techniques and materials have been developed which make high fidelity magnetic recording and reproduction of video signals possible. However, such systems, for the most part, are relatively complicated and expensive.

It is customary in present recording systems to use a rotating head assembly that records and reproduces video information on transverse tracks on a tape whose width may be 1" or 2". Such technique provides the required high relative speed between the scanning gap in the head and the magnetic tape at a low longitudinal tape motion. However, critical synchronization is required between the recording and the playback which has hitherto been achieved only with elaborate servo control circuitry as well as a separate servo control track recorded on the magnetic tape. It has also been the practice to use a third track for recording the sound portion of the intelligence. The electronic and mechanical construction required for such technique results in a unit with extremely critical tolerances and which is inherently expensive. In addition, the technique is wasteful of tape area. Alternative methods of recording which have attempted to avoid the "rotating head" approach have succeeded only in providing a picture which has been of unacceptable quality.

It is an object of the present invention to provide a simple and inexpensive apparatus and system which may be used, for example, in conjunction with a home television receiver, and which is capable of recording with high fidelity, both the video components and sound components of received television signals for subsequent reproduction by the television receiver.

A further object of the invention is to provide such an improved, inexpensive video recording/reproducing system which is capable of recording and reproducing video signals with high fidelity even in the presence of tape flutter, relatively high tape noise, and partial drop-out.

Another object of the invention is to provide such simple and inexpensive apparatus by which such recording on a magnetic tape may be carried out in a longitudinal sense with respect to the tape, rather than a series of transverse paths, so as to avoid the need for rotating transducer heads and their associated complex servo systems.

A problem in the recording of wideband video signals is the well known fact that in magnetic recording and reproducing there are both upper and lower frequency limits at which the signals can be recorded and subsequently reproduced without appreciable distortion.

The loss in response of the reproducing head and circuitry at the high frequency end of the reproducible video signal range is due to many factors. These factors include the finite width of the air gap in the magnetic core of the reproducing head used in the equipment. The loss in high frequency response is also due to eddy current losses in the core of the reproducing head, losses due to the spacing of the head from the magnetic tape, and so on.

The frequency response characteristic of the reproducing head circuitry is similar to that of a low-pass filter. The aforesaid high frequency fall off is usually referred to in the art as "aperture effect." Equalizer circuits are known in the prior art reproducers for compensating for the aperture effect. Such prior are equalizer circuits provide the required linear phase, high frequency compensating emphasis.

However, the magnetic characteristics of the head also result in an inherent decrease in the effective response of the head at the low frequency end of the video signal range. A low-pass filter is usually provided in the prior art systems to equalize the low frequency response loss of the reproducing head over the entire band. However, the use of such a low-pass filter serves to attenuate the high frequency signal components reproduced by the head, and results in an over-all loss in response. This latter loss in the prior art reproducing system is in addition to the over-all loss suffered in the use of the prior art equalizer circuit.

The reproducing portion of the preferred embodiment of the video recorder/reproducer system to be described herein utilizes equalizer circuits of the type disclosed and claimed in copending application Ser. No. 228,887, filed October 8, 1962, in the name of the present inventor. The particular equalizer circuit, as will be described, provides both low frequency and high frequency emphasis to the reproduced signals, and this is achieved with minimum attenuation in the over-all response of the reproducing system.

In addition, the recorder/reproducer system to be described herein uses pre-emphasizing noise reducing circuits in the recording portion of the system, and complementing deemphasizing circuits in the reproducing portion of the system. These circuits may be similar to those described, for example, in copending application Ser. No. 280,853, filed May 16, 1963, now abandoned, in the name of the present inventor.

It is desirable for high frequency pre-emphasizing networks to be used in the recording of the wideband video signals, because most of the noise disturbances arising in the system occur at the frequencies of the higher frequency signal components. In addition, the higher frequency signal components usually have a relatively low amplitude, so that without pre-emphasis, they are often lost in the background noise. The compensating de-emphasizing networks in the reproducing portion of the system to be described, are used to restore the correct amplitudes to the reproduced video signals throughout the entire video range.

Pre-emphasizing circuits, where used in the prior art, generate relatively high amplitude peak signals in response to abrupt amplitude deviations. The occurrence of such peak signals is especially prevalent in the recording of television signals, since the video components of the television signal often undergo abrupt amplitude deviations as the scanning process passes from a white area to a black area of the televised scene, and vice versa.

The pre-emphasizing noise reducing circuit described and claimed in the copending application Ser. No. 280,853 is most advantageous in television recording in that it exhibits non-linear characteristics. That is, for relatively low amplitude high frequency signals the pre-emphasizing noise reducing circuit of the copending application functions as a typical pre-emphasizing network. However, for the higher amplitude high frequency signal components, the boosting characteristics of the pre-emphasizing noise reducing circuit are automatically reduced, so that the production of over-emphasized peak-amplitude signals is obviated, preventing head saturation.

The improved television recording/reproducing system of the present invention also incorporates an improved sound multiplexing system, by which the sound portion of the television program is multiplexed into the video portion so that it may be recorded on the same track of the tape as the composite video signal, with optimum signal-to-noise ratio. This provides for optimum use of the available area of the recording tape.

In addition, the improved television recording/reproducing system of the present invention incorporates a simplified system for forming a secondary synchronizing component in response to the synchronizing signal component of the composite video signal, optimally suited for use in recording, whereby accurate and precise synchronization may be maintained at all times. Such "secondary" synchronizing signals are different from conventional television sync and are peculiarly adapted to analog recording.

The recorder/reproducer to be described may utilize a standard one-quarter inch width magnetic tape. The television information is recorded, for example, on four tracks on the tape. The recording of the television signal may be made in a sequential manner as the tape makes four passes (back and forth) across various sensitized portions of the head assembly. After each pass, the sensitized portion of the head assembly is switched to the next track.

The general object of the present invention, therefore, as noted, is to provide an inexpensive recording/reproducing system by means of which television signals can be recorded and subsequently reproduced with high fidelity.

Other objects and advantages of the system and apparatus of the present invention will become apparent from a consideration of the following description, when the description is taken in conjunction with the accompanying drawings. The scope of the invention will be pointed out with particularity in the claims.

Figure 1:
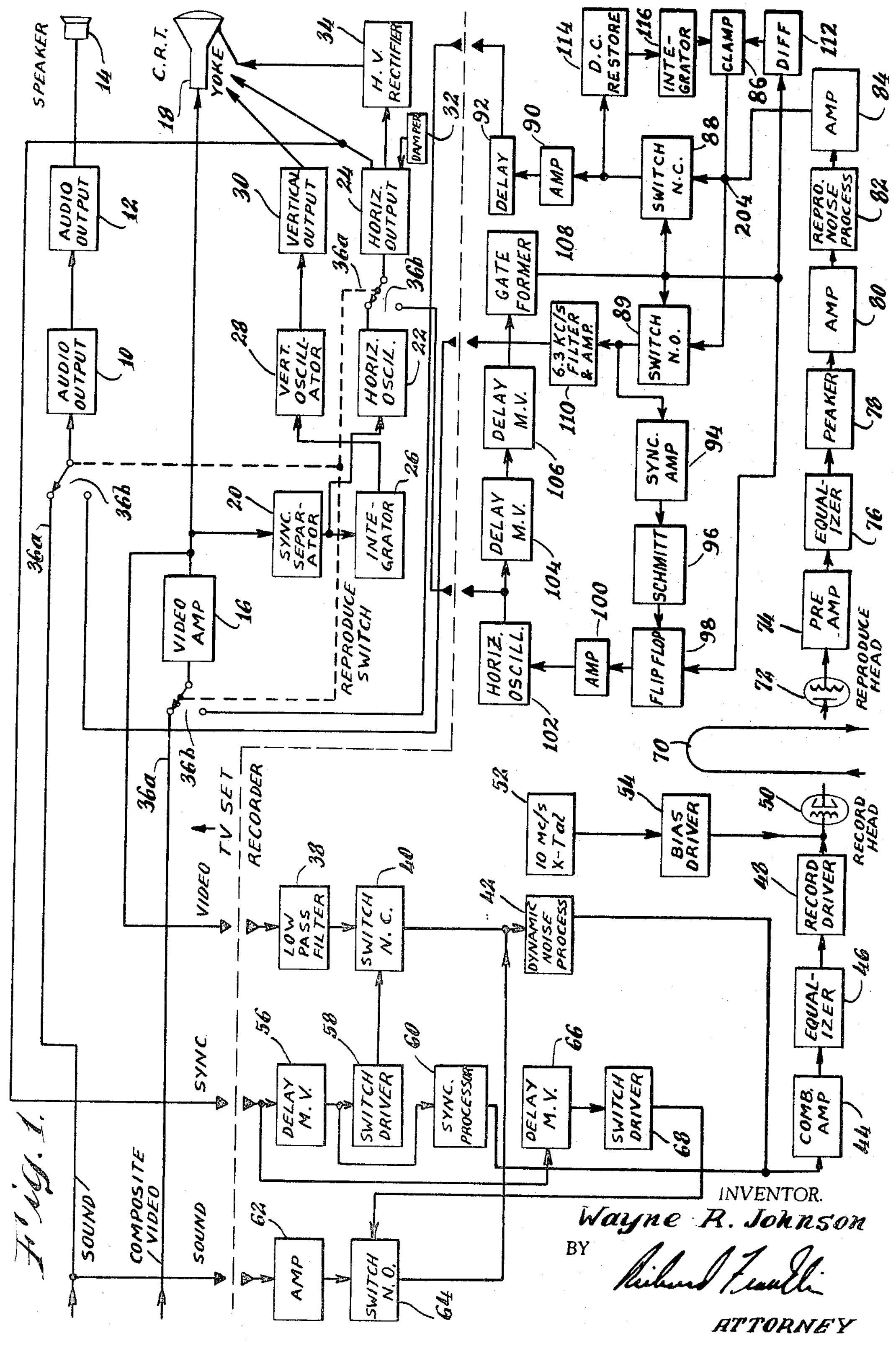
FIGURE 1 is a block diagram of portions of a typical home television receiver, and of a recorder/reproducer incorporating the concepts of the present invention, and which is connected into the circuit of the television receiver.

Referring now to FIGURE 1, the portion of a conventional television receiver illustrated in FIGURE 1 includes an audio output section shown as two amplification stages 10 and 12. The input to this section could typically be from the output of a frequency modulation detector, and the pure audio output from this section drives the speaker system of the set shown at 14.

Figure 2:
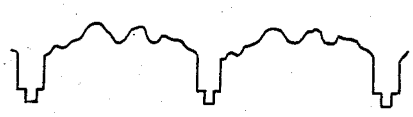
FIGURE 2 is a diagram illustrating the waveform of a typical television signal, including the horizontal synchronizing pulse components of the signal.
Figure 3:
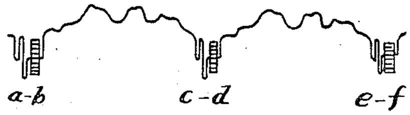
FIGURE 3 is a wave diagram of the television signal of FIGURE 2, altered in accordance with the concepts of the present invention, so as to provide a sinusoidal type of synchronizing signal for optimum recording purposes, and so as to multiplex the sound portion of the television signal into the horizontal retrace interval.

The video portion of the conventional set includes a video amplifier 16 whose input could be from the detector stage of the set (not shown). The output from video amplifier 16 is a composite video signal. As used throughout the description and the claims the term "composite video" means a signal containing either or both horizontal or vertical synchronizing information in addition to the video information. A portion of the typical composite output signal from video amplifier 16 is shown in the waveform of FIGURE 2 wherein the peaks on the portion of the signal below the reference level are the horizontal sync signals. The vertical sync is not shown.

The output of video amplifier 16 is applied, in a conventional way, to a cathode ray tube 18, the horizontal and vertical sync information being additionally applied to the horizontal and vertical deflection means of tube 18 through sync separator 20 and associated circuitry.

The horizontal sync components of the composite video signal output from video amplifier 16 control a horizontal oscillator with automatic frequency control 22 the output of which, amplified in horizontal output amplifier 24, is applied to the deflection means of tube 18. Similarly, the vertical sync portion of the composite video output from video amplifier 16 is applied to the deflection means of tube 18 through integrator circuit 26, vertical oscillator 28 and vertical output amplifier 30. Blocks 32 and 34 respectively identify the damper and high voltage rectifier circuits of a conventional television set and operate here in a conventional manner.

There are three switches 36 each with a pair of contacts identified by reference numeral **36*a* or 36*b*. In the embodiment shown they are all part of the same switching unit. The switches 36 are located respectively in the input line to audio amplifier stage 10, in the input line to video amplifier 16 and the output line from horizontal oscillator with automatic frequency control 22. Switches 36** are shown as being in their "*a*" position.

Three input signals are required by the recorder portion of the system of FIGURE 1 for the recording process and, as will be seen, they are normally supplied from the television receiver, their recordation being permitted or prevented by energization of the record circuitry. The three signals are the sound signals taken from the input to audio output amplifier stage 10, the horizontal sync pulses from the output of horizontal output amplifier 24 and the composite video signals from the output of video amplifier 16. The points of origin of these three signals may be different if desired. For example, the sound signal can be taken at any point after the frequency modulation detection stage of the television set; the composite video signal at any point after the last detection stage of the television set, and the horizontal sync pulses at any point after the output of the horizontal oscillator with automatic frequency control 22. By selecting the horizontal sync pulse after stage 22 a "clean" sync pulse is provided as an input to the recorder circuitry, simplifying its construction.

In the recorder portion of the system at the left of FIGURE 1, the composite video signal from video amplifier 16 is applied to a normally conducting or "closed" switch 40 through a low-pass filter 38 which may contain a 2.25 megacycle (Gaussian) low-pass filter of suitable design and which serves to remove high frequency noise from the composite video signal. The input to normally closed switch 40 from low-pass filter 38 appears as an input to dynamic noise processor 42 which may, for example, incorporate dynamic pre-emphasizing noise reducing circuitry such as is described in copending United States patent application Ser. No. 280,853, filed May 16, 1963, in the name of the present inventor.

Processor 42 serves to accentuate the higher frequency signal components which, since normally having lower energy, tend to be lost in the subsequently occurring record/reproduce system produced noise. Dynamic noise processor 42 provides pre-emphasis in accordance with the rate of change of instantaneous value of its input signal. Thus, signals of a given high frequency of low amplitude receive a proportionately greater amount of pre-emphasis than do such signals of high amplitude. This is desirable because the latter already possesses an advantage over interference noise. The efficiency of dynamic noise processor 42 depends on the fact that the energy content of information signals decreases with increasing frequency and that system noise is triangular.

The output from dynamic noise processor 42 is applied as an input to a combining or buffer amplifier 44 and the output of buffer amplifier 44 is applied as an input to equalizer circuit 46. Equalizer 46 modifies the signals applied to it to compensate in advance for known losses which will occur during the recording process because of the inherent response deficiencies of the record head. Equalizing circuitry for magnetic recording is broadly known and equalizer 46 may be of a conventional type. Preferably, however, it may incorporate the circuitry described in copending United States patent application Ser. No. 228,887, filed Oct. 8, 1962, in the name of the present inventor.

The output from equalizer 46 provides the input signal to record driver 48 and thence to magnetic record head 50. The usual alternating-current bias signal for record head 50 is derived from a crystal oscillator 52 and a bias driver 54 which AC bias signal is supplied to recording head 50 in the usual manner, in conjunction with the signal from equalizer 46 as amplified in record driver 48. The signal is then recorded on magnetic tape indicated by reference numeral 70.

The output from horizontal output 24 is applied as an input to a delay multivibrator 56 and the output of multivibrator 56, shown in FIGURE 4E, is applied both to switch driver circuit 58 and to sync processor 60. As will be seen in the description of FIGURE 7 hereinafter, the output of sync processor 60 resembles the waveform shown in FIGURE 4G. The output from switch driver 58 opens normally closed switch 40 interrupting the passage of the composite video signals therethrough from low-pass filter 38. This output from switch driver 58 is shown in FIGURE 4A and is timed to open switch 40 to interrupt the composite video signal during horizontal retrace intervals thus eliminating the original horizontal sync signals and portions of the pedestals. While the output through switch 40 is interrupted the output from sync processor 60, the secondary sinusoidal sync, is recorded on the magnetic tape 70 through combining amplifier 44, equalizer circuit 46, record driver 48 and recording head 50.

The pure audio output from the frequency modulation detector stage of the television receiver is applied as an input to normally open or nonconducting switch 64 through an audio amplifier 62. The operative or enabling input to gate 64 which permits the passage of the sound signal is derived from the sync input to multivibrator 56. That input also appears as an input to "sound" delay multivibrator stage 66 and the output from multivibrator 66, closes switch 64 through switch driver 68.

It will be clear from a comparison of the waveforms of FIGURE 4A (opening switch 40) and FIGURE 4C (closing switch 64) that the delay provided by multivibrator 56 is shorter than that provided by multivibrator 66, and that the output from switch driver 58 is longer than that from switch driver 68. It should be noted that throughout the apparatus illustrated in this description, the various timing functions are accomplished primarily through the use of multivibrators, though other types of delay means could well be used to obtain the various time intervals. For example, one or more recirculating delay lines appropriately tapped, or one or more "clock" circuits could be employed with appropriate modification of the system.

The signal from switch driver 68 samples the sound signal from the television receiver by a series of pulses applied to close switch 64. The resulting output from switch 64 is pure audio, amplitude modulated pulse signal and is applied as an input to dynamic noise processor 42 and from there passes on to be recorded on magnetic tape 70 in a manner previously described.

Figure 4:
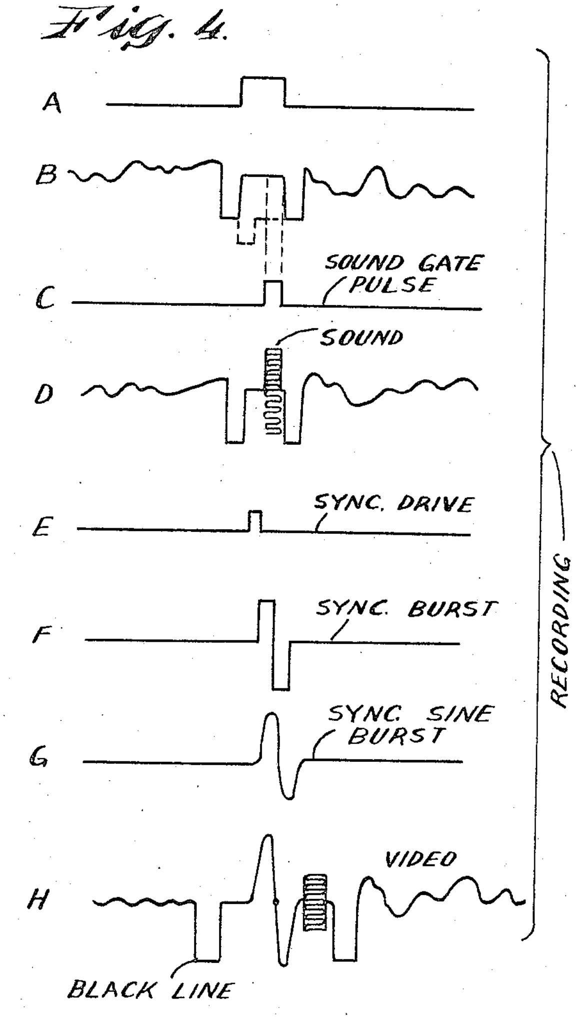
FIGURES 4 and 5 are a series of waveforms, useful in explaining the operation of FIGURES 1 and 6–10.

As may be seen in the various waveforms of FIGURE 4 (where the time scale for FIGURES 4E through 4H is approximately one and one half times that for FIGURES 4A through 4D) the video signal through switch 40 is recorded, the switch then being opened by signal 4A from stages 56 and 58 during the horizontal retrace interval thereby deleting the original horizontal sync. The secondary sinusoidal sync is then generated in stage 60 and recorded, and thereafter, the sound signal is sampled by the pulsed closing of switch 64 and recorded all the while switch 40 is opened. The resulting recorded signal, after the separate parts are sequentially combined in combining amplifier 44, is seen in FIGURE 4H.

When reproduction of tape-recorded information is desired switches 36 are placed in their *b* position, i.e., **36*a* contacts open, 36*b*** contacts closed.

Tape 70 is scanned by a stationary reproduce head 72 and the composite signal (audio, video and sync) amplified in a pre-amplification stage 74. The output from amplifier 74 then passes through an equalization stage 76 which again may be conventional but which preferably may incorporate the circuitry of the aforementioned copending application Ser. No. 228,887. As equalizer stage 46 in the record section compensated in advance for known losses that will occur in the record process, so equalizer stage 76 compensates for losses that are known to occur during the reproduce process due to inherent reproduce head deficiencies.

The output from equalizer 76 is applied as an input to peaker stage 78 which might be considered a further equalization stage and which provides additional compensation for the high and low drops in response of reproduce head 72. The output from peaker stage 78 is amplified by amplifier stage 80 and applied as an input to reproduce noise processor stage 82 which, like its counterpart stage 42, preferably incorporates the de-emphasizing circuitry of the aforementioned copending application Ser. No. 280,853. Stage 82 complements the action of emphasizing stage 42 and, as described in Ser. No. 280,853, substantially reduces noise introduced between the two stages.

Figure 5:
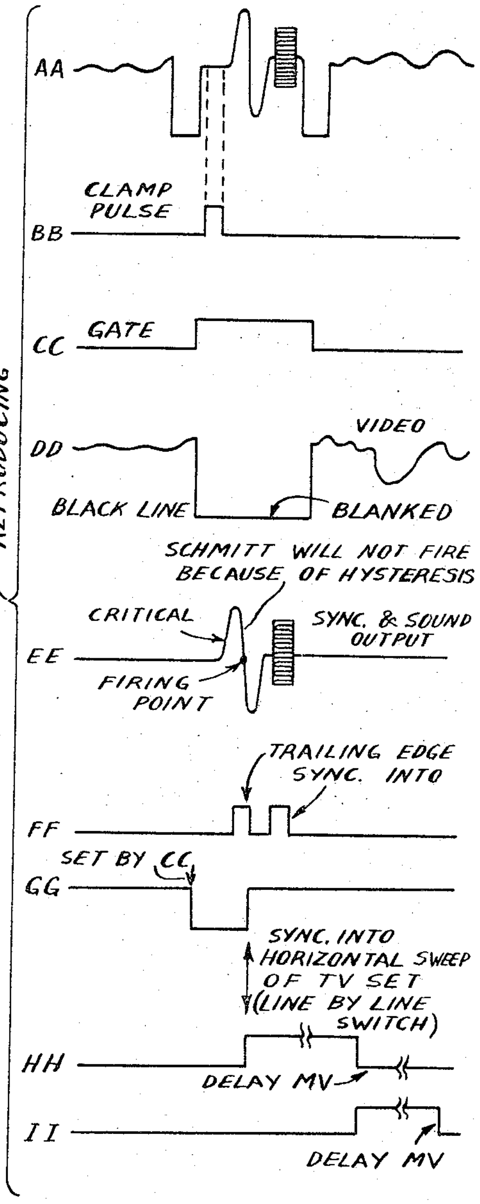

The output from stage 82 is amplified by amplifier stage 84 and applied as an input to normally closed switch 88 and normally open switch 89 through a junction 204 regulated by a clamp circuit 86. Switch 88 is essentially the same as the switch circuitry shown in block 40 of the record portion of the system, switch 89 corresponding to block 64 and switches 88 and 89 function in substantially the same manner as their counterpart record stages. The composite video signal from amplifier 84 is applied to switch 88 and during the time the video portion of the composite signal is present and is permitted to pass through normally closed switch 88 to amplifier 90, delay stage 92 which might be of the order of three micro seconds and thereafter appears as an input to video amplifier 16. It will be noted that when switches 36 are in their *b* condition the horizontal sync generating portion of the television receiver is disconnected at the output of horizontal oscillator 22. During the time the horizontal retrace portion of the composite video signal is present as the output from amplifier 84, a blanking or switch opening signal is applied to switch 88 from the output of gate former 108 and an enabling or switch closing signal is applied to normally open switch 89. The derivation of this blanking signal, seen in FIGURE 5CC, will be described below but its effect is similar to the effect of the blanking signal shown in FIGURE 4A. The composite video signal output from amplifier 84 is shown in FIGURE 5AA and the resultant input to video amplifier 16 from amplifier 90 and delay 92 is seen in FIGURE 5DD. The purpose of delay 92, as will be clear in the description to follow, is to delay the video signal to compensate for the delay in the sync signal which is to be reformed by the reproduce circuitry.

When switch 89 is closed the sync and sound portion of the composite video output from amplifier 84 is applied to sync amplifier 94, and the output of amplifier 94 is applied as an input to a Schmitt trigger 96 the output of which in turn is applied to a flip flop 98.

Schmitt trigger 96 may be adjusted so that it will be "armed" or primed at a signal level intermediate the reference level and the normally occurring peak amplitude of the signal and will fire when the sinusoidal sync signal passes through the reference level before commencing its negative going excursion relative thereto. Since the audio or sound signal may resemble the sinusoidal synchronizing signal (as seen in FIGURE 5EE) and may have a similar effect on Schmitt trigger 96, flip flop 98 is included acting as a gate to distinguish between an output from Schmitt trigger 96 caused by the reference level crossing of the sinusoidal sync signal and a spurious or unwanted output therefrom caused by the pulse sampled audio signal. Flip flop 98, as will be seen, is placed in its output producing condition prior to the anticipated arrival of the sinusoidal sync signal. The output from Schmitt trigger 96 in response to the sinusoidal sync signal as an input thereto places flip flop 98 in its non-output producing condition the transition thereby providing an output from flip flop 98. Flip flop 98 will then remain in a non-output producing state regardless of subsequent inputs thereto from Schmitt trigger 96 until it is once again put in its output producing condition. The derivation of the signal changing the condition of flip flop 98 from non-output producing to output producing will be described below.

The output provided by Schmitt trigger 96 and flip flop 98 in response to the application of the sinusoidal sync signal derived from tape 70, is amplified in amplifier stage 100 and applied as an input to horizontal synchronizing signal generator stage shown as oscillator 102, the output of which, in turn, is applied through terminal **36*b* to horizontal output amplifier 24** of the television receiver. It will be appreciated that a separate sync signal is generated for each separate horizontal line permitting line by line correction of the sync.

The output from horizontal oscillator 102 is also applied as an input to a two stage delay section shown as delay multivibrator 104 and thence to another delay multivibrator 106. The purpose of the stages 104 and 106 is to delay the horizontal sync output from horizontal oscillator 102 until the next horizontal blanking interval so that the sync signal for one line effects the gating of the non-video portion of the composite video signal for the next lie in switches 88 and 89. The output from delay multivibrator 106 is applied as an input to gate former circuit 108 and the output from gate former circuit 108 shown as waveform 5CC is applied as a blanking or switch opening input to switch 88 as previously described.

It is clear from the description above, that the first several lines of video information may not have precise horizontal synchronization but this information is rapidly derived from the sync forming circuitry described and the temporary defect is substantially unnoticeable to the observer, not only because of the speed with which the circuit locks in, but also because of the normal television receiver "overscan."

In addition, the output from gate former 108 is applied through differentiator circuit 112 as an input to clamp 86. The signal provided through DC restorer circuit 114 and integrator 116, taken from the input to amplifier 90, adjusts the level of clamp 86. This is provided since it is advantageous that clamp 86 have a floating reference level, the reference level being the average brightness of the video information, which is derived from the input to amplifier 90; that signal, through DC restorer 114, being integrated over the period of a full frame in integrator 116. The operation of clamp 86 and its associated circuit stages will be more fully described in connection with the discussion of FIGURE 10 below. The output from gate former 108, in addition, to affecting switches 88 and 89, and clamp 86, is also used to set flip flop 98 to its output producing condition so that it will provide an output in response to the next output from Schmitt trigger 96 which will occur in response to the recorded sync signal for the next line.

There is a critical level of sync signal amplitude below which the signal may not drop if the Schmitt trigger is to be primed for firing. However, this level is sufficiently low so that a large amount of drop-out or signal attenuation can be tolerated by the circuitry before the sync signal is lost. Such drop-out might be caused, for example, by dirt between the magnetic tape and the reproduce head which would cause signal attenuation, or a deficiency in the recording tape itself, etc.

Thus, by adjusting the Schmitt trigger to fire at the reference level crossing the reproduce timing is not amplitude sensitive. As will be appreciated, the output from horizontal oscillator 102 generates a delayed gate signal through stages 104, 106 and 108. This delayed gate signal thus anticipates the appearance of the horizontal sync pulse for the following line. In this manner synchronization is effected line by line rather than by conventional averaging automatic frequency control techniques insuring that the visual degradation caused by time displacement errors is minimized.

The output from the normally open switch 89 which appears as an input to sync amplifier 94 during the horizontal retrace portion of the composite video signal when switch 89 has been closed by the signal from gate former 108, is applied also as input to the 6.3 kilocycle low-pass filter and amplifier 110. This circuit extracts the amplitude modulated pulses comprising the sound portion of the input signal only, since the sync signal is occurring at a repetition rate in excess of 6.3 kilocycles per second and is filtered out. Thus, the multiplexed sound comprising the samples of the audio only signal as recorded on the tape, is extracted simply through the inclusion of a suitable low-pass filter. The output from stage 110 is applied as an input to audio output stage 10 through switch **36*b* located in the input to stage 10**.

As was pointed out above, in the description of the record portion of the circuitry, the delay multivibrators in the embodiment shown could be replaced with one or more suitable delay lines appropriately tapped to provide the various time differences between the different signals required by the system or other available delay means.

Figure 6:
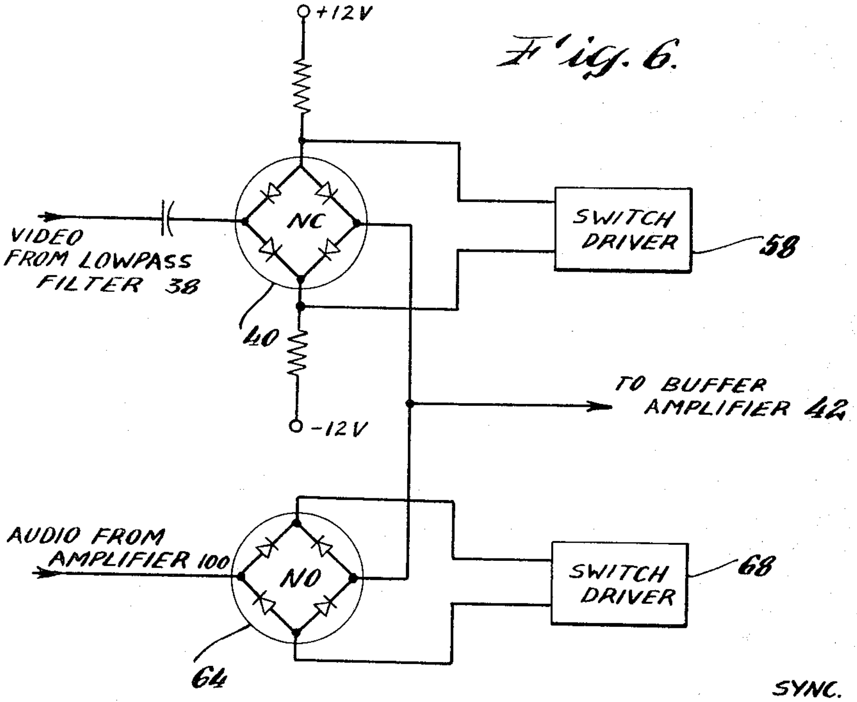
FIGURES 6–10 are circuit diagrams of various components of the recorder and reproducer portions of the embodiment of the invention to be described.

Referring now to FIGURE 6, a simplified drawing, partly in schematic, is shown of one embodiment of the circuitry shown in blocks 40 and 64 of FIGURE 1, and which might be included as switches 88 and 89 of FIGURE 1. Extensive description of this figure is not believed to be required. Switch 40, for example, is shown as a four diode matrix normally permitting the output from low-pass filter 38 of FIGURE 1 to appear as an input to block 42 of FIGURE 1. A signal from switch driver 58 will block the diode array (opening switch 40) preventing further inputs to block 42 from the low-pass filter. Thereafter, during the time the horizontal sync sinusoidal signals are being applied to combining amplifier 44 of FIGURE 1 switch driver 68 will be actuated by a signal from the output of delay multivibrator 66 closing normally open switch 64 which again is shown as consisting of a diode matrix, permitting the sound output from amplifier 100 to appear at the input to block 42. This figure has been included simply to indicate one form of switching circuit suitable for use in blocks 40 and 64.

Figures 7, 8:
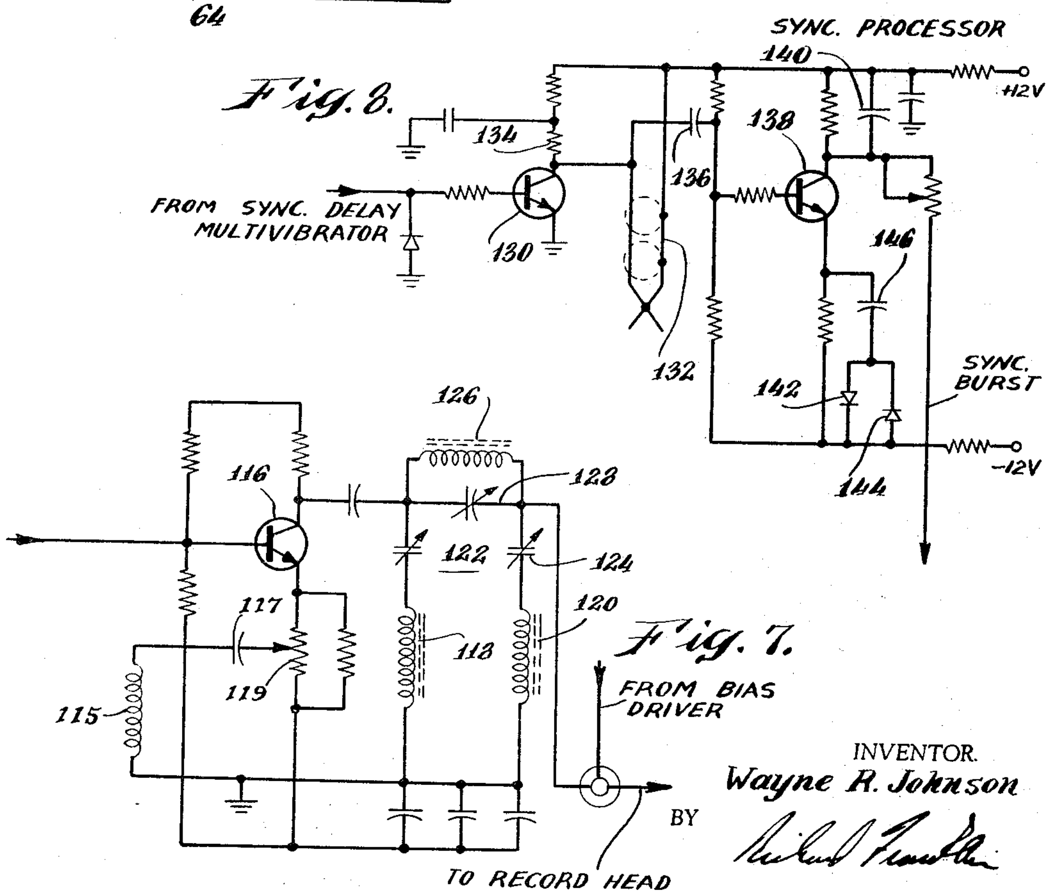

Referring now to FIGURE 7, an equalization circuit is shown suitable for use in block 46 of FIGURE 1. This equalizer stage consists essentially of transistor amplifier 116 and emitter circuit components including an inductance 115, capacitor 117 and variable resistor 119. As will be recalled from the description of the equalizer in FIGURE 1, the function of the circuit shown here by way of illustration is to emphasize the high and low peaks of the signal to be recorded to compensate for known deficiencies in the high and low frequency response in the record head.

The output of transistor 116 taken from its collector, is applied to the input of the record driver 48 of FIGURE 1 across a pair of series resonant circuits consisting respectively of fixed inductors 118 and 120 and tuned capacitors 122 and 124, and through a parallel resonant circuit consisting of a fixed inductor 126 and a tuned capacitor 128. These resonant circuits function as a bias trap to prevent bias signals from appearing at the collector of transistor 116. The amount of gain or loss supplied by the equalizer circuit consisting of the three resonant circuits is determined by the impedance at the emitter of transistor 116 and the values of the various components of these resonant circuits may be selected accordingly.

Referring now to FIGURE 8, the sync processor illustrated in block form by reference numeral 60 of FIGURE 1 is shown. The input to transistor amplifier 130 is the waveform shown in FIGURE 4E and the output taken from the collector of transistor 130 is applied to a shorted delay line 132, the output signal, inverted 180°, also appearing at the collector of transistor 130. The waveform at the collector may be seen in FIGURE 4F. This waveform is applied as an input to the base of transistor 138 through a load resistor 134 and a capacitor 136, the time constant of the base circuit components being relatively short to round off the leading edge of the waveform shown in FIGURE 4F. The output of transistor 138 is taken from the collector thereof and appears as an input to the combining amplifier 44 shown in FIGURE 1. The time constants of the input and output circuit components of transistor 138 round off corners of the input thereto giving the configuration shown in idealized approximately sinusoidal waveform in FIGURE 4G. Oppositely poled diodes 142 and 144 and capacitor 146 are included in the emitter circuit of transistor 138 so that transistor 138 presents a high impedance to low frequency signals thus acting as a noise suppressor circuit to provide a relatively noise free base line compensating for any noise which may be introduced by delay line 132.

Figure 9:
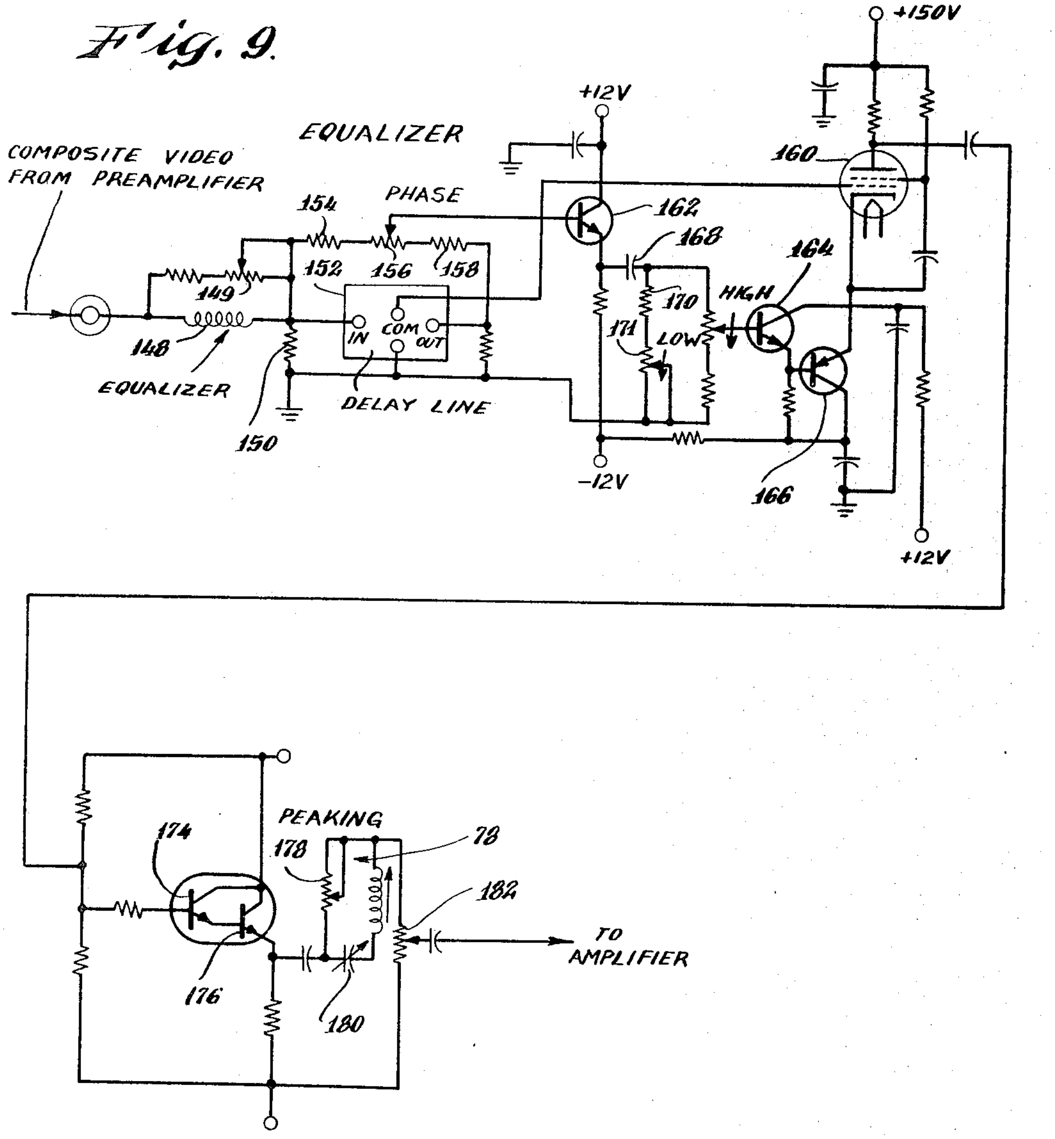

Referring now to FIGURE 9, the equalizer and peaking circuitry of the reproduce portion of the unit shown as blocks 76 and 78 of FIGURE 1 are shown for the sake of completeness. Here again, as with FIGURE 6, for a full understanding of the operation of the equalizer circuitry reference should be had to the aforementioned copending Ser. No. 228,887. The input to the equalizer circuit is the amplified composite video signal from the output of pre-amplifier stage 74 of FIGURE 1, and is applied to delay line 152 through inductance 148 and across resistor 150. The entire frequency spectrum of the input to the equalizer stage from pre-amplifier 74 is applied to one control grid of differential amplifier 160, shown as a pentode, from the common tap of delay line 152. The other control grid of differential amplifier 160 receives the high and mid-frequency components of the output from pre-amplifier 74, through the high-pass filter in the emitter circuit of transistor 162, the effect of the mid-frequency components being regulable by the resistor with adjustable tap in the base circuit of transistor 166. Differential amplifier 160, though shown as a pentode, could be replaced by an equivalent solid state circuit. The compensation provided the components of the composite video signal appearing at the output of differential amplifier 160 is such that a uniformly flat response is exhibited over the entire video frequency range.

The output from differential amplifier 160 is connected to a peaking circuit (block 78 of FIGURE 1) through a pair of transistors 174 and 176 which operate as an impedance matching stage between the output of pentode 160 and the input to the peaking circuit. Peaking circuit 78, which includes adjustable resistor 178, adjustable capacitor 180 and fixed inductance 182, is designed to peak at approximately 2 megacycles and provides a crispening effect to the visual portion of the signal from pentode 160.

Figure 10:
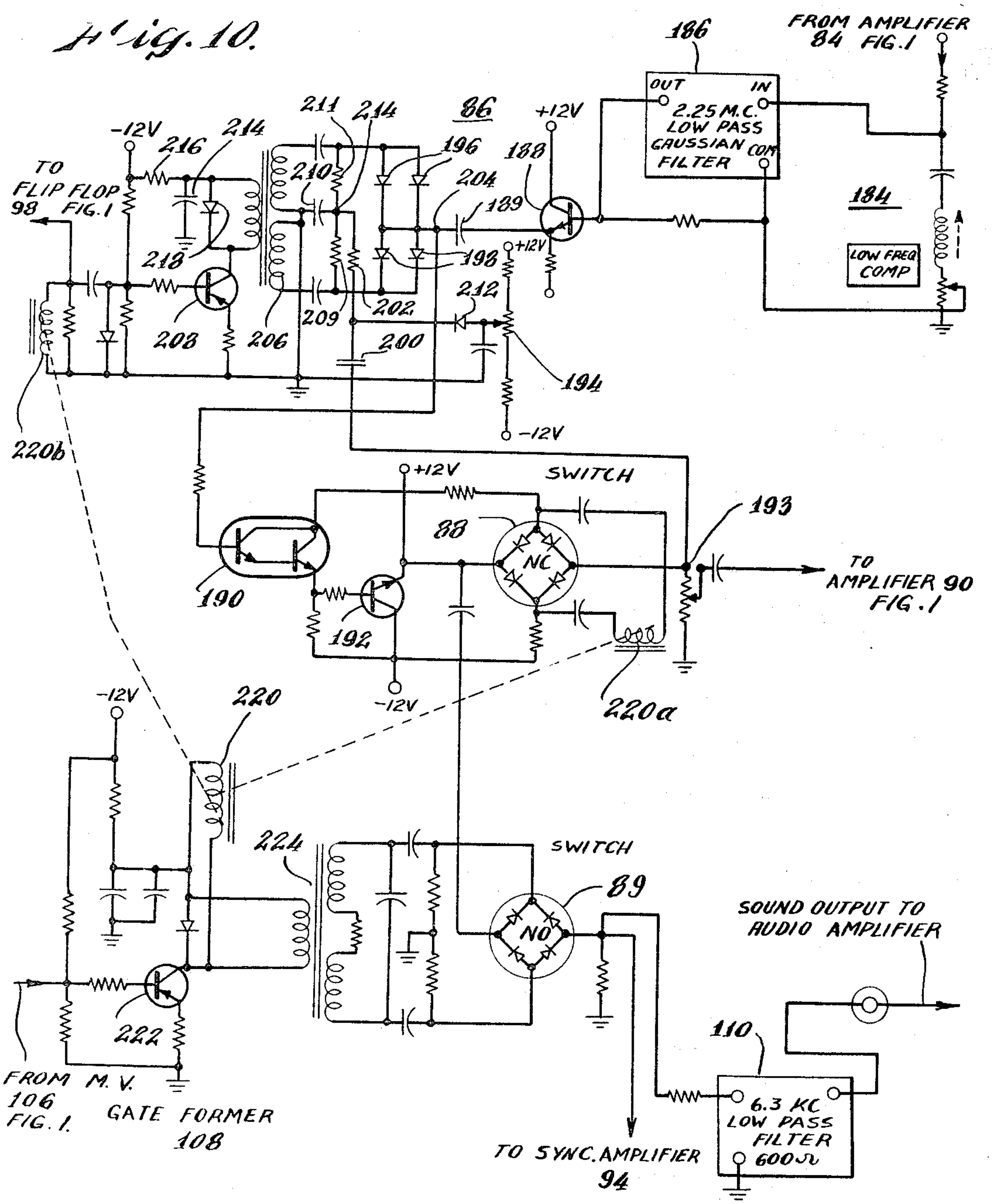

Referring now to FIGURE 10, a schematic diagram is presented showing blocks 86, 88, 89, 108, 110, 112, 114 and 116 of FIGURE 1. The composite video output from amplifier 84 is applied through a 2.25 megacycle low-pass Gaussian filter 186 across a low frequency compensating network shown as a series resonant circuit 184 including a variable resistor, a capacitor and an inductor. Low-pass filter 186 serves to substantially reduce the noise at frequencies in excess of the desired video band pass. The output from low-pass filter 186 is applied through impedance matching transistor 188 as an input to switch 88 through further impedance matching transistor stages 190 and 192. Switch 88 is normally closed and the input signal thereto appears at the output and will be applied as an input to video amplifier 90 of FIGURE 1. The output from switch 88 is also fed back to clamp circuit 86 of FIGURE 1 through an integrating network including capacitor 200 and resistor 202. Diode pairs 196 and 198, together with their associated circuit components, form a clamp circuit which clamps video level appearing at junction 204. The operation of circuit loop including clamp circuit 86 will be described below.

The composite video signal applied through normally closed switch 88 has also been present as an input to switch 89 which is normally open, thus preventing the passage of any signal therethrough. It will be recalled from the description of the block diagram of FIGURE 1, that the input to gate former stage 108 is taken from the output of delay multivibrator 106 and the input to that delay multivibrator stage was ultimately derived from Schmitt trigger 96. The derivation of the output signal from gate former 108 will now be described.

Gate former 108 is shown in FIGURE 10 as including a transformer 220, one secondary or output winding **220*a* being associated with switch 88 and one output winding 220*b* associated both with the input to flip flop 98 of FIGURE 1 and with the input to differentiator 112 of FIGURE 1. In the preferred embodiment of the invention, the duration of the waveform shown in FIGURE 5HH (derived from the multivibrators included in block 104 of FIGURE 1) is equivalent to one line or 63 micro seconds. The waveform shown in FIGURE 5II is the output from delay multivibrator 106 and appears as an input to the base of transistor 222**.

The output from transistor 222, taken from the collector thereof, appears by transformer action at output winding **220*a* in the form shown in FIGURE 5CC and opens normally closed switch 88, interrupting the input to amplifier 90. The signal shown in FIGURE 5CC is also provided at output winding 220*b* and is applied as the set input to flip flop 98 of FIGURE 1, thus permitting the next output from Schmitt trigger 96 to be effective. The use of this output in connection with clamp circuit 86** will be discussed below.

The output from transistor 222 is also applied as an input to transformer 224. The output of transformer 224, also represented by the waveform of FIGURE 5CC, serves to close normally open switch 89 permitting the signal from amplifier 84 to appear at the output of switch 89. The output from tranformer 224 is timed so that the output from switch 89 will contain the sync and audio portion of the composite video signal. The audio information is extracted through the 6.3 kilocycle low-pass filter 110 as was described above. The output from switch 89 is also applied to Schmitt trigger 96 through sync amplifier 94 of FIGURE 1 and, since flip flop 98 is in its set, or output producing condition, this output from Schmitt trigger 96 will cause an output from flip flop 98 during its transition from the set to reset conditions, the flip flop output synchronizing horizontal oscillator 102 through amplifier 100.

It will be recalled from the description of FIGURE 1 above, that the gating signal for switches 88 and 89 is derived from the composite video input to amplifier 84, the blanking signal for one line being derived from the horizontal retrace portion of the composite video signal of the preceding line. The initial gating signal when the reproduce portion of the unit is first turned on is provided by horizontal oscillator 102 which will be supplying signals to delay multivibrator 104 though at a rate slightly less than the required rate. The first few horizontal lines, when a reproduce function is initiated, will not be properly timed relative to the video information. The closed-loop synchronizing system, illustrated in the block diagram, however, will quickly lock into correct timing relationship with the video portion of the composite signal and the visual effect at the cathode ray tube is not noticeable.

Referring now to FIGURE 10 wherein is shown the circuitry included in blocks 86, 112, 114 and 116 of FIGURE 1, the output from emitter follower stage 188 is applied to junction point 204 of the circuit through coupling capacitor 189 and thence to normally closed switch 88 through transistor stages 190 and 192. The output from switch 88, at junction point 193, is applied to junction point 214 of the circuit through integrator circuit 116 (FIGURE 1) consisting of capacitor 210 and resistor 202 providing a signal related to the average brightness of the video signal. Also applied to junction 214 through resistor 202 and diode 212 is a fixed DC potential which is variable through a resistor with adjustable tap 194 connected between a source of plus and minus 12 volt D.C. potential source. The potential, then, at junction 214, consists of the algebraic sum of the signal at junction 193 from the output of switch 88 integrated through capacitor 200 and resistor 202, and the fixed DC potential through diode 212 and resistor 202. The potential at this junction will act as a DC restoring signal whose amplitude will be dependent upon and vary with the average brightness of the video output as determined by the integrated signal from junction 193.

As was mentioned above, the output from secondary 220*b*, included in gate former stage 108, which serves to set flip flop 98, is also employed in connection with clamp circuit 86. The output from secondary 220*b* (seen in FIGURE 5CC) is differentiated in the base circuit of transistor 208. The peaked input corresponding to the leading edge of waveform 5CC applied to the base of transistor 208 provides an output from transistor 208 to drive transformer 206. The output of transformer 206 is of the form shown in FIGURE 5BB and is applied through diode pairs 196 and 198 and resistors 209 and 211 to capacitors 210 and 211. Thus, a voltage whose magnitude is determined by the charge on capacitor 210 prior to the output from transformer 206, will be applied to capacitor 189 to affect the level of the signal appearing at the input to switch 88 from the output of amplifier 188. The output from transformer 206 will occur at the horizontal line frequency rate and will thus adjust the clamp level line by line with respect to the average picture brightness of the preceding line.

Summarizing the operation of this circuit, the video portion of the composite signal derived from the record medium passes clamp junction point 204, then through normally closed switch 88 to amplifier 90 of FIGURE 1. The output from switch 88, in addition, is integrated by capacitor 210 and resistor 202, added to the D.C. potential from diode 212 and its associated divider network, and stored in capacitor 210. Initially, at the free running rate of oscillator stage 102, and thereafter at its rate as phase controlled by the secondary horizontal sync signals derived from the record medium, gate former stage 108 will open switch 88 (output from secondary 202*a*), close switch 89 (output from transformer 224) and reset flip flop 98 (output from secondary 220*b*) the latter output also resetting the clamp level at circuit junction 204 as previously described.

As can be seen from a comparison of the waveform shown in FIGURES 5AA and 5BB, the clamp pulse occurs in time on the "front porch" of the sync signal or that portion of time immediately prior to the appearance of the secondary sinusoidal synchronizing signal derived from the tape, the timing being achieved by differentiating the output from secondary 220*b* by differentiator stage 112 (FIGURE 1) in the base circuit of transistor 208.

It may be noted at this point that substantially all of the vertical synchronizing signals appearing at the output of video amplifier 16 were recorded on the record medium along with the video signal, only about 17% of the vertical sync information being lost by the blocking of normally closed switch 40. These vertical sync signals are derived from the tape as part of the composite signal, and applied with the video component of the composite signal to video amplifier 16 from amplifier 90 and delay 92. The portion of the vertical sync information lost, as a result of the blocking of switches 40 and 88 during the occurrence of the horizontal sync signals in the record and later in the reproduce process, does not critically affect the operation of integrator 26 and vertical oscillator 28, substantially 83% of the vertical sync intelligence remaining.

A number of circuit simplifications or alternatives are readily apparent from the above description. By way of illustration of such simplifications the redundancy in the circuit as presented in block diagram form in FIGURE 1 could be wholly or partially eliminated. For example, horizontal oscillator stage 102 could be eliminated and the output from amplifier 100 applied as an input directly to delay multivibrator 107 and also to horizontal oscillator 22 in the television receiver. Switches 88 and 89 could be eliminated and comparable switches 40 and 64 used both for the record and the reproduce function, etc. Also, as mentioned above, the various timing functions required by the record and the reproduce operation have been achieved in the embodiment described above primarily through the use of delay multivibrators though these timing functions could be provided by one or more suitably tapped delay lines or by a "clock" which would generate a series of pulses at a desired repetition rate the appropriate pulses then being selected either by counting or other known techniques. Also, if desired, it is not necessary that the vertical synchronizing information be taken from the television receiver set, retained throughout the record process, and then used (as derived from the tape) on the reproduce process. New vertical synchronizing information could be generated in much the same fashion as the generation of the horizontal synchronizing information, either through inclusion of a separate circuit in the record side with appropriate modification of the reproduce circuitry, or just through modification of the reproduce circuitry alone.

Finally, it will be appreciated that the system described may be used with the sound signal recorded in a conventional manner on a separate track of the recording medium, or on a separate medium, or, for certain application, the sound may be dispensed with entirely so that, while the audio modulated pulsed sound multiplexed into the composite signal is a desirable and advantageous feature of the preferred embodiment of the invention it is not essential to its most basic operation.

Values of certain of the circuit components shown in FIGURES 7–10 which have been included in one embodiment of the invention which operated satisfactorily, are:

FIGURE 7:

| | | |
|---|---|---|
| Inductance **115** | microhenries | .3–.8 |
| Transistor **116** | | 2N2219 |
| Capacitor **117** | microfarads | .008 |
| Resistor **119** | ohms | 100 |

FIGURE 8:

| | | |
|---|---|---|
| Resistor **134** | kilo ohms | 3.9 |
| Capacitor **136** | micro microfarads | 470 |
| Transistor **138** | | 2N2218 |
| Capacitor **140** | micro microfarads | 390 |

FIGURE 9:

| | | |
|---|---|---|
| Inductance **148** | millihenries | 3.9 |
| Adjustable resistor **149** | kilo ohms | 5 |
| Resistor **154** | ohms | 15 |
| Adjustable resistor **156** | kilo ohms | 5 |
| Resistor **158** | do | 1 |
| Transistor **162** | | 2N2218 |
| Transistor **164** | | 2N163 |
| Transistor **166** | | 2N1031 |
| Capacitor **168** | microfarad | 1 |
| Resistor **170** | kilo ohms | 1.8 |
| Adjustable resistor **171** | do | 10 |

FIGURE 10:

| | | |
|---|---|---|
| Capacitor **189** | microfarads | .022 |
| Transistor **190** | | FSP–22 |
| Transistor **192** | | 2N2904 |
| Resistor **194** | kilo ohms | 2.2 |
| Capacitor **200** | microfarad | 1 |
| Resistor **202** | kilo ohms | 100 |
| Capacitor **210** | microfarads | .47 |
| Resistor **211** | kilo ohms | 4.7 |
| Capacitor **214** | microfarads | 100 |
| Resistor **216** | kilo ohm | 1 |

While what has been shown and described above is believed to be the best mode and a preferred embodiment of the invention modifications and variations may be made therein, as will be clear to those skilled in the art, without departing from the spirit of the invention. Accordingly, the scope of the invention is intended to be limited solely by the appended claims.

What is claimed is:

1. A system for recording and reproducing a standard composite television program signal including video, sound, horizontal line and vertical field synchronizing components comprising: first, second and third input circuits for respectively supplying a first signal including at least video information, a second signal comprising separated synchronizing components and a third signal comprising sound information; first circuit means connected to said first circuit for suppressing at least a portion of the non-video information from said first signal to develop substantially a video-only signal; second circuit means connected to said second input circuit for deriving from said second signal a secondary synchronizing signal; third circuit means connected to said third input circuit for sampling said third signal at horizontal line frequency to develop an amplitude modulated pulse signal having a predetermined phase relation to said secondary synchronizing signal; combining means connected to the output of said first, second and third circuit means for combining said amplitude modulated pulse signal, said secondary synchronizing signal and said substantially video-only signal in proper time sequence; means for recording said combined signals on a record medium; pick-up means for deriving said recorded signal from said medium; fourth circuit means for separating said amplitude modulated pulse signals, said secondary synchronizing signal and said substantially video-only signals; and a plurality of output circuits individually responsive to said separated signals.

2. A system for recording and reproducing a composite television signal including at least video signals and horizontal synchronizing signals comprising: a first input circuit for supplying first signals including at least video information having recurrent intervals for horizontal synchronizing information; a second input circuit for supplying second signals including at least a series of horizontal synchronizing information associated with said first signal; first circuit means connected to said first input circuit for normally passing said first signal; compensating circuit means connected to said first circuit means for imparting thereto a preselected amplitude-frequency response characteristic effective to compensate for signal degradation and noise occurring in the record process; generator means connected to said second input circuit for producing a secondary synchronizing signal in response to each of said second signals, said secondary synchronizing signals each having a positive and negative going excursion relative to a reference level; control means connected between said second input circuit and said first circuit means, said control means being responsive to the initiation of each series of said second signals to prevent passage of said first signals through said first circuit means during said intervals for horizontal synchronizing information; record means; means coupling said record means to the outputs of said compensating circuit means and said generator means for recordation on a single track of said medium in alternating sequence; pick-up means for deriving said recorded signal from said medium; second circuit means connected to said pick-up means for passing said derived signal in the absence of a blocking input thereto; a first utilization circuit connected to the output of said second circuit means; generator means connected to said pick-up means and responsive to said secondary synchronizing signals for producing an independent series of horizontal synchronizing signals; a second utilization circuit connected to the output of said generator means; and means coupling the output of said generator means to said second circuit means as a blocking input thereto.

3. A system for recording on a single track on a medium video signals and at least associated secondary horizontal synchronizing signals comprising: a plurality of input circuits for individually supplying a first signal including at least video information having recurrent intervals for horizontal synchronizing information and a second signal including at least a series of horizontal synchronizing signals associated with said first signal; circuit means coupled to a first of said input circuits for suppressing said first signal during said horizontal synchronizing intervals; compensating circuit means connected to said circuit means for imparting thereto a preselected amplitude-frequency response characteristic effective to compensate for signal degradation and noise occurring in the record process; generator means coupled to another of said input circuits and responsive to said second signal for producing a secondary synchronizing signal having a positive and negative going excursion relative to a reference level; record means; and means coupling said record means to the outputs of said compensating circuit means and said generator means in alternating sequence for recording on a single track of said medium.

4. A system for recording on a single track on a medium video signals and at least associated secondary horizontal synchronizing signals comprising: a first input circuit for supplying first signals including at least video information having recurrent intervals for horizontal synchronizing information; a second input circuit for supplying second signals each including at least a series of horizontal synchronizing signals associated with said first signals; first circuit means connected to said first input circuit for normally passing said first signal, compensating circuit means connected to said circuit means for imparting thereto a preselected amplitude-frequency response characteristic effective to compensate for signal degradation and noise occurring in the record process; generator means connected to a second input circuit for producing said secondary synchronizing signal in response to each occurrence of said second signal; said secondary synchronizing signals each having a positive and negative going excursion relative to a reference level; control means connected between said second input circuit and said circuit means, said control means being responsive to each of said second signals to prevent passage of said first signal through said circuit means during said intervals for horizontal synchronizing information; record means; and means coupling said record means to the outputs of said compensating circuit means and said generator means for recordation on a single track of said medium in alternating sequence.

5. A system for recording on a single track on a medium video signals and at least associated secondary horizontal synchronizing signals comprising: a first input circuit for supplying first signals including at least video information having recurrent intervals for horizontal synchronizing information; a second input circuit for supplying second signals including at least horizontal synchronizing information associated with said first signals; circuit means connected to said first input circuit for passing said first signal in the absence of a blocking input thereto; compensating circuit means connected to the output of said circuit means for imparting thereto a preselected amplitude-frequency response characteristic effective to compensate for signal degradation and noise occurring in the record process; delay means connected to said second input circuit for providing an output signal a predetermined time after the application thereto of each of said second signals; control means connected between the output of said delay means and said circuit means for providing a blocking input to said circuit means during said intervals for horizontal synchronizing information; secondary synchronizing signal generator means connected to the output of said delay means for producing a secondary synchronizing signal having a positive and negative going excursion relative to a reference level in response to each output from said delay means; record means for recording on a single track of a medium an analog representation of input signals applied thereto; and means coupling the outputs of said secondary synchronizing signal generator means to said record means for recording on a single track of said medium in alternating sequence.

6. A system for recording on a single track on a medium video signals and at least associated secondary horizontal synchronizing signals comprising: a first input circuit for supplying first signals including at least video information having recurrent intervals for horizontal synchronizing information; a second input circuit for supplying second signals including at least horizontal synchronizing information associated with said first signal; circuit means connected to said first input circuit for passing said first signal in the absence of a blocking input thereto; dynamic pre-emphasis means connected to said circuit means for selectively and non-linearly emphasizing components of said first signal in accordance with their instantaneous rate of change and amplitude to minimize signal loss due to noise which may occur during the record process; delay means connected to said second input circuit for providing an output signal a predetermined time after the application thereto of each of said second signals; control means connected between the output of said delay means and said circuit means for providing a blocking input to said circuit means during said intervals for horizontal synchronizing information; secondary synchronizing signal generator means connected to the output of said delay means for producing a secondary synchronizing signal having a positive and negative going excursion relative to a reference level in response to each output from said delay means; record means for recording on a single track of a medium an analog representation of input signals applied thereto; and means coupling the outputs of said dynamic pre-emphasis means and of said secondary synchronizing signal generator means to said record means for recording on a single track of said medium in alternating sequence, said coupling means including an equalizer circuit for selectively modifying high and low frequency components of the signals applied thereto.

7. A system for recording on a medium at least video signals, associated secondary horizontal synchronizing signals and audio signals comprising: a first input circuit for supplying first signals including at least video information having recurrent intervals for horizontal synchronizing information; a second input circuit for supplying second signals including at least horizontal synchronizing information associated with said first signal; a third input circuit for supplying a pure audio signal; first circuit means connected to said first input circuit for passing said first signal in the absence of a blocking signal thereto; compensating circuit means connected to said first circuit means for imparting thereto a preselected amplitude-frequency response characteristic effective to compensate for signal degradation and noise occurring in the record process; second circuit means connected to said third input circuit for passing said audio signal only in the presence of an enabling signal thereto; delay means connected to said second input circuit for providing first and second delay signals predetermined times after each horizontal synchronizing input thereto; coupling means coupling said first signal from said delay means to said first circuit means as a blocking signal thereto; secondary synchronization signal generating means responsive to each of said first signals from said delay means to produce a secondary horizontal synchronizing signal; means coupling said second signal from said delay means to said second circuit means as an enabling input thereto; record means for recording signals on said medium; and means coupling the outputs of said first circuit means, said second circuit means and said secondary horizontal synchronization signal generating means to said record means for recording on said medium in their order of occurrence.

8. A system for recording on a medium at least video signals, associated secondary horizontal synchronizing signals and audio signals comprising: a first input circuit for supplying first signals including at least video information having recurrent intervals for horizontal synchronizing information; a second input circuit for supplying second signals including at least horizontal synchronizing information associated with said first signal; a third input circuit for supplying a pure audio signal; first circuit means connected to said first input circuit for passing said first signal in the absence of a blocking input thereto; compensating circuit means connected to said first circuit means for imparting thereto a preselected amplitude-frequency response characteristic effective to compensate for signal degradation and noise occurring in the record process; second circuit means connected to said third input circuit for passing said audio signal only in the presence of an enabling signal thereto; delay means connected to said second input circuit for providing first and second delay signals predetermined times after each horizontal synchronizing input thereto, said second delay signal occurring during a portion of the duration of said first delay signal; coupling means coupling said first signal from said delay means to said first circuit means as a blocking input thereto; secondary horizontal synchronization signal generating means responsive to each of said first signals from said delay means to produce a secondary horizontal synchronizing signal having a positive and negative going excursion relative to a reference level; means coupling said second signal from said delay means to said second circuit means as an enabling input thereto during a portion of the time said first circuit means is blocked; record means for recording signals on said medium; and means coupling the outputs of said first circuit means, said second circuit means and said secondary horizontal synchronization signal generating means to said record means for recording on said medium in their order of occurrence.

9. A system for deriving from a record medium having a composite signal recorded thereon including video information and secondary synchronizing signals, video signals and separate horizontal synchronizing signals comprising: pick-up means for deriving said composite signal from said medium; circuit means connected to said pick-up means for passing said composite signal in the absence of a blocking input thereto; a first utilization circuit connected to the output of said circuit means; generator means connected to said pick-up means and responsive to each of said secondary synchronizing signals for producing an independent series of horizontal synchronizing signals, a second utilization circuit connected to the output of said generator means, and means coupling the output of said generator means to said circuit means as a blocking input thereto.

10. A system for obtaining from a record medium having a composite signal recorded thereon including intervals each containing video information signals and intervals each containing a secondary horizontal synchronizing signal, video signals and separate horizontal synchronizing signal comprising: pick-up means for deriving said composite signal from said medium; first circuit means connected to said pick-up means for passing said composite signal in the absence of a blocking input thereto; a first utilization circuit connected to the output of said first circuit means; an adjustable-phase generator means for producing an independent series of horizontal synchronizing signals; a second utilization circuit connected to the output of said generator means; second circuit means connected to said pick-up means for passing said composite signal only in the presence of an enabling input thereto; delay means connected between said first and second circuit means and the output of said controllable generator means, the delayed output of said delay means providing a blocking input to said first circuit means and an enabling input to said second circuit means in response to each input thereto from said generator means.

11. A system for obtaining from a record medium having a composite signal recorded thereon including intervals each containing video information signals and intervals each containing a secondary horizontal synchronizing signal, video signals and separate horizontal synchronizing signal comprising: pick-up means for deriving said composite signal from said medium; first circuit means connected to said pick-up means for passing said composite signal in the absence of a blocking input thereto; a first utilization circuit connected to the output of said first circuit means; an adjustable-phase generator means for producing an independent series of horizontal synchronizing signals; a second utilization circuit connected to the output of said generator means; second circuit means connected to said pick-up means for passing said composite signal only in the presence of an enabling input thereto; a control circuit connected between the output of said second circuit means and said generator means for providing a phase adjusting signal to said generator means in response to each secondary horizontal synchronizing signal; delay means connected between said first and second circuit means and the output of said generator means, the delayed output from said delay means providing a blocking input to said first circuit means and an enabling input to said second circuit means in response to each input thereto from said generator means; said delay means having parameters effective to provide a delay substantially equal to the duration of each video information interval.

12. A system for obtaining from a record medium having a composite signal recorded thereon including intervals each containing video information signals and intervals each containing a secondary horizontal synchronizing signal having positive and negative going excursions relative to a reference level, video signals and separate horizontal synchronizing signal comprising: pick-up means for deriving said composite signal from said medium; first circuit means connected to said pick-up means for passing said composite signal in the absence of a blocking input thereto; a first utilization circuit connected to the output of said first circuit means; an adjustable-phase generator means for producing an independent series of horizontal synchronizing signals; a second utilization circuit connected to the output of said generator means; second circuit means connected to said pick-up means for passing said composite signal only in the presence of an enabling input thereto; a control circuit connected between the output of said second circuit means and said generator means for providing a phase adjusting signal to said generator means in response to the reference level crossing of each of said secondary horizontal synchronizing signals; delay means connected between said first and second circuit means and the output of said generator means, the delayed output of said delay means providing a blocking input to said first circuit means and an enabling input to said second circuit means in response to each input thereto from said generator means, said delay means having parameters effective to provide a delay substantially equal to the duration of each video information interval.

13. A system for obtaining from a record medium having a composite signal recorded thereon including intervals each containing video information signals and intervals each containing a secondary horizontal synchronizing signal having positive and negative going excursions relative to a reference level, video signals and separate horizontal synchronizing signal comprising: pick-up means for deriving said composite signal from said medium; compensating circut means connected to said reproduce means for imparting thereto a preselected amplitude frequency response charatceristic effective to compensate for signal degradation and noise occurring during recordation of the signal on the medium and the derivation of the signal from the medium; first circuit means connected to the output of said compensating circuit means for passing said composite signal in the absence of a blocking input thereto; a first utilization circuit connected to the output of said first circuit means; an adjustable-phase generator means for producing an independent series of horizontal synchronizing signals; a second utilization circuit connected to the output of said generator means; second circuit means connected to said pick-up means for passing said composite signal only in the presence of an enabling input thereto; a control circuit connected between the output of said second circuit means and said generator means, said control circuit including means responsive to the reference level crossing of said secondary horizontal synchronizing signal to provide a phase adjusting signal to said generator means; delay means connected between said first and second circuit means and the output of said generator means, the delayed output of said delay means providing a blocking input to said first circuit means and an enabling input to said second circuit means in response to each input thereto from said generator means, said delay means having parameters effective to provide a delay substantially equal to the duration of each video information interval.

14. A system for deriving separate video signals, horizontal synchronizing signals and audio signals from a record medium having a composite signal recorded thereon including first intervals each containing video information and second intervals each containing secondary horizontal synchronizing information and audio information comprising: pick-up means for deriving said composite signal from said medium; first circuit means connected to said pick-up means for passing said composite signal in the absence of a blocking input thereto; first utilization means connected to the output of said first circuit means; an adjustable-phase generator means for producing an independent series of horizontal synchronizing signals; a second utilization circuit connected to the output of said generator means; second circuit means connected to said pick-up means for passing said composite signal only in the presence of an enabling input thereto; a control circuit connected between the output of said second circuit means and said generator means and responsive to the secondary horizontal synchronizing signal component of each output from said second circuit means to provide a phase adjusting signal to said generator means; means coupling the output of said generator means to said first circuit means as a blocking input thereto and to said second circuit means as an enabling input thereto, said coupling means providing said blocking and enabling inputs during said second intervals of said composite signal; sound extraction means connected to the output of said second circuit means for passing only the audio information components of the output from said second circuit means; and a third utilization circuit connected to the output of said sound extraction means.

15. A system for deriving separate video signals, horizontal synchronizing signals and audio signals from a record medium having a composite signal recorded thereon including first intervals each containing video information and second intervals each containing secondary horizontal synchronizing information and audio information comprising: pick-up means for deriving said composite signal from said medium; first circuit means connected to said pick-up means for passing said composite signal in the absence of a blocking input thereto; first utilization means connected to the output of said first circuit means; an adjustable-phase generator means for producing an independent series of horizontal synchronizing signals; a second utilization circuit connected to the output of said generator means; second circuit means connected to said pick-up means for passing said composite signal only in the presence of an enabling input thereto; a control circuit connected between the output of said second circuit means and said generator means; delay means connected between said first and second circuit means and the output of said generator means, the delayed output of said delay means providing a blocking input to said first circuit means and an enabling input to said second circuit means in response to each input thereto from said generator means, said delay means having parameters effective to provide a delay substantially equal to the duration of each video information interval; a filter connected to the output of said second circuit means for passing only the audio information components of the output of said second circuit means; and a third utilization circuit connected to the output of said filter.

16. A system for obtaining separate video signals, horizontal synchronizing signals and audio signals from a record medium having a composite signal recorded thereon including first intervals each containing video information and second intervals each containing secondary horizontal synchronizing information having positive and negative going excursions relative to a reference level and audio information comprising: pick-up means for deriving said composite signal from said medium; first circuit means connected to said pick-up means for passing said composite signal in the absence of a blocking input thereto; first utilization means connected to the output of said first circuit means; an adjustable-phase generator means for producing an independent series of horizontal synchronizing signals; a second utilization circuit connected to the output of said generator means; second circuit means connected to said pick-up means for passing said composite signal only in the presence of an enabling input thereto; a control circuit connected between the output of said second circuit means and said generator means and responsive to the secondary horizontal synchronizing signal component of each output from said second circuit means for providing a phase adjusting signal to said generator means; said control circuit including means responsive to the reference level crossing of said secondary horizontal synchronizing signal to provide said phase adjusting signal to said generator means; delay means connected between said first and second circuit means and the output of said generator means, the delayed output of said delay means providing a blocking input to said first circuit means and an enabling input to said second circuit means in response to each input thereto from said generator means, said delay means having parameters effective to provide a delay substantially equal to the duration of each video information interval; a filter connected to the output of said second circuit means for passing only the audio information component of the output of said second circuit means; and a third utilization circuit connected to the output of said filter.

17. A system for deriving separate video signals, horizontal synchronizing signals and audio signals from a record medium having a composite signal recorded thereon including first intervals each containing video information and second intervals each containing secondary horizontal synchronizing information having positive and negative going excursions relative to a reference level and audio information comprising: pick-up means for deriving said composite signal from said medium; first circuit means connected to said pick-up means for passing said composite signal in the absence of a blocking input thereto; first utilization means connected to the output of said first circuit means; an adjustable-phase generator means for producing an independent series of horizontal synchronizing signals; a second utilization circuit connected to the output of said generator means; second circuit means connected to said pick-up means for passing said composite signal only in the presence of an enabling input thereto; a control circuit connected to the output of said second circuit means for providing a control signal in response to the reference level crossing of each of said secondary horizontal synchronizing signals; gate means connected between the output of said control circuit and said generator means for providing a phase adjusting signal to said generator means in response to said control signal only subsequent to the application of en enabling input thereto; delay means connected between said first and second circuit means and the output of said generator means, the delayed output of said delay means providing a blocking input to said first circuit means and an enabling input to said second circuit means and to said gate means in response to each input thereto from said generator means; said delay means having parameters effective to provide a delay substantially equal to the duration of each video information interval; a filter connected to the output of said second circuit means for passing only the audio information component of the output of said second circuit means; and a third utilization circuit connected to the output of said filter.

References Cited

UNITED STATES PATENTS

| | | | |
|---|---|---|---|
| 2,785,222 | 3/1957 | White | 178—7.3 |
| 3,180,929 | 4/1965 | Hibbard et al. | 178—6.6 |

JOHN W. CALDWELL, *Acting Primary Examiner.*

H. W. BRITTON, *Assistant Examiner.*